US 9,657,367 B2

(12) United States Patent
Furusawa et al.

(10) Patent No.: US 9,657,367 B2
(45) Date of Patent: May 23, 2017

(54) METHOD FOR PRODUCING R-FE-B BASED PERMANENT MAGNET ALLOY RECYCLED MATERIAL HAVING REMOVED CARBON

(75) Inventors: Katsuyoshi Furusawa, Osaka (JP); Atsushi Kikugawa, Osaka (JP)

(73) Assignee: HITACHI METALS, LTD., Tokyo (JP)

( * ) Notice: Subject to any disclaimer, the term of this patent is extended or adjusted under 35 U.S.C. 154(b) by 440 days.

(21) Appl. No.: 14/125,715

(22) PCT Filed: Jun. 29, 2012

(86) PCT No.: PCT/JP2012/066712
§ 371 (c)(1),
(2), (4) Date: Dec. 12, 2013

(87) PCT Pub. No.: WO2013/002376
PCT Pub. Date: Jan. 3, 2013

(65) Prior Publication Data
US 2014/0123809 A1    May 8, 2014

(30) Foreign Application Priority Data

Jun. 30, 2011 (JP) ................................ 2011-145338

(51) Int. Cl.
*C22B 7/00* (2006.01)
*H01F 41/02* (2006.01)
(Continued)

(52) U.S. Cl.
CPC .................. *C22B 1/00* (2013.01); *B22F 8/00* (2013.01); *C22B 1/005* (2013.01); *C22B 7/00* (2013.01);
(Continued)

(58) Field of Classification Search
None
See application file for complete search history.

(56) References Cited

U.S. PATENT DOCUMENTS 3,970,485 A    7/1976  Doser
4,981,532 A *  1/1991  Takeshita ................ B22F 9/023
                                                            148/302
(Continued)

FOREIGN PATENT DOCUMENTS

CN    1033018 A    5/1989
CN    1293435 A    5/2001
(Continued)

OTHER PUBLICATIONS

First Office Action issued on Jul. 20, 2015 to the corresponding Chinese patent application No. 201280031803.2.
(Continued)

*Primary Examiner* — George Wyszomierski
(74) *Attorney, Agent, or Firm* — Kratz, Quintos & Hanson, LLP

(57) ABSTRACT

An object of the present invention is to provide a method for producing an alloy recycled material by effectively removing carbon from a carbon-containing alloy, which is produced as scrap or sludge of an R—Fe—B based permanent magnet, a used magnet, or the like. The method of the present invention as a means for resolution is characterized in that a carbon-containing R—Fe—B based permanent magnet alloy is subjected to an HDDR treatment to remove carbon. An alloy recycled material produced by the method of the present invention contains a reduced amount of carbon. Therefore, in the case where it is recycled for the production of a magnet, even when an increased amount is subjected to high-frequency heating in a vacuum melting furnace, a non-negligible increase in the amount of carbon contained in the produced magnet can be avoided.

6 Claims, 4 Drawing Sheets

(51) Int. Cl.
  *C22B 1/00*   (2006.01)
  *B22F 8/00*   (2006.01)
  *C22B 59/00*  (2006.01)

(52) U.S. Cl.
  CPC .............. *C22B 7/001* (2013.01); *C22B 59/00* (2013.01); *H01F 41/0253* (2013.01); *B22F 2998/10* (2013.01); *Y02P 10/214* (2015.11); *Y02P 10/24* (2015.11); *Y02W 30/541* (2015.05)

(56) References Cited

U.S. PATENT DOCUMENTS

| | | | |
|---|---|---|---|
| 8,734,714 B2* | 5/2014 | Harris | C22B 7/002 148/105 |
| 2006/0162821 A1 | 7/2006 | Reppel | |
| 2009/0032147 A1* | 2/2009 | Nozawa | B22F 3/11 148/302 |

FOREIGN PATENT DOCUMENTS

| | | |
|---|---|---|
| CN | 1866417 A | 11/2006 |
| CN | 101015859 A | 8/2007 |
| JP | H2-4901 | 1/1990 |
| JP | 10-012473 A | 1/1998 |
| JP | 10-022155 A | 1/1998 |
| JP | 2006-508241 A1 | 3/2006 |

OTHER PUBLICATIONS

A. Sakamoto, et al.; "Suiso Fun'iki Chunetsu Shori ni yoru Nd-Fe-B-kei Seikeitai eno Eikyo;" Abstracts of Meeting of Japan Society of Powder and Powder Metallurgy; vol. 2008; Nov. 5, 2008; p. 120 and end sheet (2 sheets total)/Cited in International Search Report.
International Search Report for International Application No. PCT/JP2012/066712 dated Oct. 2, 2012.
Second Office Action issued on Mar. 17, 2016 in the corresponding Chinese patent application No. 201280031803.2.

* cited by examiner

METHOD FOR PRODUCING R-FE-B BASED PERMANENT MAGNET ALLOY RECYCLED MATERIAL HAVING REMOVED CARBON

TECHNICAL FIELD

The present invention relates to a method for producing an alloy recycled material by removing carbon from a carbon-containing alloy, which is produced as scrap or sludge of an R—Fe—B based permanent magnet (R: rare earth element such as Nd, Pr, or Dy), a used magnet, or the like.

BACKGROUND ART

As is widely known, R—Fe—B based permanent magnets such as Nd—Fe—B based permanent magnets are produced from inexpensive materials, whose resources are abundant, and also have high magnetic characteristics, and thus they are used in various fields today. Against such a background, in R—Fe—B based permanent magnet production plants, magnets are produced in large amounts every day. However, with an increase in the amount of magnets produced, the amount of magnet scrap discharged as a defectively processed product or the like, magnet sludge discharged as cutting waste, grinding waste, or the like, etc., in the production process has also been increasing. In particular, with the weight and size reduction of information devices, the size of magnets used therein has also been reduced, leading to an increase in the proportion of processing allowance, and, as a result, the production yield tends to decrease year by year. Accordingly, how to recycle magnet scrap, magnet sludge, and the like discharged in the production process rather than discarding them is an important technical challenge for the future. The same also applies to how to recycle used magnets recovered from waste electrical appliances and the like.

An R—Fe—B based permanent magnet is generally produced through a process in which a plurality of raw material metals are mixed in a predetermined ratio and subjected to high-frequency heating in a vacuum melting furnace to give an alloy material of predetermined composition. Considering the case where magnet scrap, magnet sludge, used magnets, and the like are recycled for the production of a magnet, in terms of energy saving, cost reduction, etc., it would be ideal if they could be directly subjected to high-frequency heating in a vacuum melting furnace to give an alloy recycled material, but it has not been put into practice in reality. One of the reasons is that magnet scrap, magnet sludge, used magnets, and the like contain, in the magnet structure, carbon from an organic lubricant or the like used in the magnet production process, and thus, when an alloy recycled material is obtained therefrom and used to produce a magnet, carbon contained therein adversely affects the magnetic characteristics of the magnet. Accordingly, in order to recycle magnet scrap, magnet sludge, used magnets, and the like for the production of a magnet, it is preferable to remove carbon contained therein.

As a method for removing carbon from a carbon-containing R—Fe—B based permanent magnet alloy such as magnet scrap, magnet sludge, a used magnet, or the like, for example, Patent Document 1 proposes a method in which carbon contained in the alloy is reduced using calcium metal or calcium hydride as a reducing agent, thus converted into calcium carbide, and removed. However, this method has a problem in that because rare earth carbides are thermodynamically more stable than calcium carbide, a rare earth carbide is produced prior to calcium carbide, and thus a large amount of rare earth carbide is removed, resulting in a poor yield of rare earth element in the recycled alloy material. Patent Document 2 also discloses a method in which magnet scrap containing carbon in the form of powder is heat-treated in an oxygen atmosphere at a temperature of 700° C. to 1200° C. for 1 hour to 10 hours to cause oxidation and decarburization. However, this method has a problem in that a large amount of rare earth oxide is produced during oxidation and decarburization, and thus a large amount of calcium metal or the like is required as a reducing agent to reduce the produced rare earth oxide, resulting in high cost. Another problem is that calcium metal or the like used as a reducing agent is contained in the recycled alloy material as an impurity, resulting in adverse effects on the magnetic characteristics of the magnet. Therefore, according to heretofore proposed methods, it has not been possible to effectively remove carbon contained in magnet scrap, magnet sludge, a used magnet, or the like. Thus, in order to avoid a non-negligible increase in the amount of carbon contained in the magnet produced, in the actual situation, recycling of them for the production of a magnet is performed in a mode where they are fed to a vacuum melting furnace little by little, subjected to high-frequency heating together with a virgin alloy material, and thus used, or a mode where they are chemically recycled, recovered as a rare earth element, and thus used. However, these modes have problems in that, for example, even when an attempt is made to reduce the amount of virgin alloy material used for the purpose of cost reduction, the amount that can be reduced is naturally limited, and also in the case of chemical recycling, the impact of discharged liquid waste on the environment must be considered.

PRIOR ART DOCUMENTS

Patent Document

Patent Document 1: JP-A-S58-73731
Patent Document 2: JP-A-2003-51418

SUMMARY OF THE INVENTION

Problems that the Invention is to Solve

Thus, an object of the present invention is to provide a method for producing an alloy recycled material by effectively removing carbon from a carbon-containing alloy, which is produced as scrap or sludge of an R—Fe—B based permanent magnet, a used magnet, or the like.

Means for Solving the Problems

In view of the above points, the present inventors have conducted extensive research. As a result, they have found that when a carbon-containing R—Fe—B based permanent magnet alloy is subjected to an HDDR treatment, which is well known to those skilled in the art as a method used in the production of an R—Fe—B based anisotropic bonded magnet for refining crystal grains to obtain an alloy powder having high magnetic characteristics, totally surprisingly, carbon can be effectively removed from the carbon-containing R—Fe—B based permanent magnet alloy.

A method for producing an R—Fe—B based permanent magnet alloy recycled material according to the present invention accomplished based on the above findings is, as defined in claim 1, characterized in that a carbon-containing R—Fe—B based permanent magnet alloy is subjected to an HDDR treatment to remove carbon.

A method as defined in claim 2 is characterized in that in the method of claim 1, the carbon-containing R—Fe—B based permanent magnet alloy is in the form of a powder having a particle size of 75 µm to 850 µm.

A method as defined in claim 3 is characterized in that in the method of claim 1, the HDDR treatment includes an HD step performed in a hydrogen gas atmosphere at 600° C. to 900° C.

Further, a method for removing carbon from a carbon-containing R—Fe—B based permanent magnet alloy according to the present invention is, as defined in claim 4, characterized in that a carbon-containing R—Fe—B based permanent magnet alloy is subjected to an HDDR treatment.

Further, a method for producing an R—Fe—B based permanent magnet according to the present invention is, as defined in claim 5, characterized in that an alloy recycled material produced by the method for producing an R—Fe—B based permanent magnet alloy recycled material according to claim 1 is used as at least a part of raw materials.

Effect of the Invention

According to the present invention, a method for producing an alloy recycled material by effectively removing carbon from a carbon-containing alloy, which is produced as scrap or sludge of an R—Fe—B based permanent magnet, a used magnet, or the like can be provided. An alloy recycled material produced by the method of the present invention contains a reduced amount of carbon. Therefore, when it is recycled for the production of a magnet, an increase in the amount of carbon contained in the produced magnet can be suppressed. Accordingly, the present invention allows for the efficient recycling of magnet scrap, magnet sludge, used magnets, and the like for the production of a magnet, whereby the amount of virgin alloy material used can be reduced, and also the frequency of chemical recycling can be reduced. Thus, the present invention contributes to energy saving, cost reduction, environmental protection, etc.

MODE FOR CARRYING OUT THE INVENTION

Figure 1:
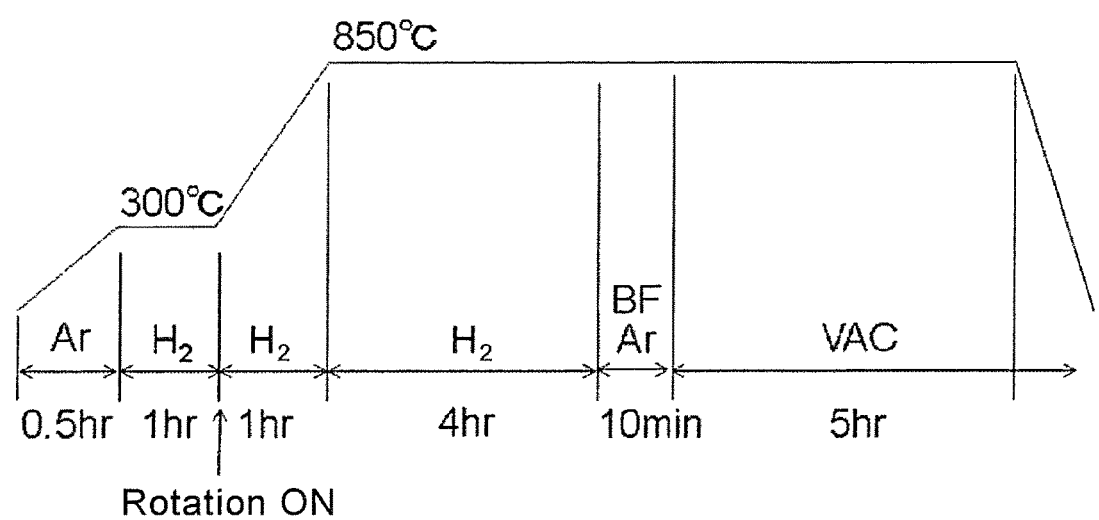
FIG. 1 It shows a treatment pattern for removing carbon contained in an alloy powder employed in Example 5.

The method for producing an R—Fe—B based permanent magnet alloy recycled material of the present invention is characterized in that a carbon-containing R—Fe—B based permanent magnet alloy is subjected to an HDDR treatment to remove carbon.

Examples of carbon-containing R—Fe—B based permanent magnet alloys to be treated in the present invention include, but are not limited to, magnet scrap, magnet sludge, and used magnets containing, in the magnet structure, carbon from an organic lubricant or the like used in the magnet production process. There is no particular limit on the carbon content of a carbon-containing R—Fe—B based permanent magnet alloy, which is an object to be treated. However, the present invention is particularly effective for a magnet alloy having a carbon content of 0.04 mass % or more, from which carbon is preferably removed at the time of recycling (the upper limit of the carbon content of a magnet alloy is 0.12 mass % in view of the amount of carbon usually contained in magnet scrap, magnet sludge, a used magnet, or the like).

The HDDR treatment performed on a carbon-containing R—Fe—B based permanent magnet alloy in the present invention means a Hydrogenation-Disproportionation-Desorption-Recombination treatment. The treatment is well known to those skilled in the art as a method in which an alloy ingot or alloy powder for use in the production of an R—Fe—B based permanent magnet is allowed to undergo hydrogenation, disproportionation, desorption, and recombination at a high temperature (e.g., 500° C. to 1000° C.), thereby refining crystal grains of the alloy to improve magnetic characteristics. The HDDR treatment is roughly divided into the following steps: an HD step, in which a rare earth element in the alloy is hydrogenated, and also a disproportionation reaction of the alloy structure is allowed to proceed, and a subsequent DR step, in which dehydrogenation is performed to allow a recombination reaction of the alloy structure to proceed. In the HD step, a reaction such as $Nd_2Fe_{14}B+2H_2 \rightarrow 2NdH_2+12Fe+Fe_2B$ proceeds, and in the DR step, a reaction such as $2NdH_2+12Fe+Fe_2B \rightarrow Nd_2Fe_{14}B+2H_2$ proceeds. In the present invention, such a series of reactions that proceed through an HDDR treatment are utilized to remove carbon contained in an R—Fe—B based permanent magnet alloy.

In the HDDR treatment performed on a carbon-containing R—Fe—B based permanent magnet alloy, the HD step may be performed with the carbon-containing R—Fe—B based permanent magnet alloy, which is an object to be treated, being placed in a predetermined furnace. It is preferable that the carbon-containing R—Fe—B based permanent magnet alloy placed in a furnace is in the form of a powder having a particle size of 75 µm to 850 µm. When the particle size of the powder is too small, it may be difficult to handle, while when it is too large, the decarburization reaction may be difficult to proceed. The particle size of the powder is more preferably 100 µm to 700 µm, and still more preferably 200 µm to 500 µm. A powder having a predetermined particle size can be obtained employing mechanical grinding in a jaw crusher, a hammer mill, a stamp mill, etc., hydrogen decrepitation, or the like as required, but carbon can be removed more effectively in the case where hydrogen decrepitation is employed. This is presumably because when a magnet alloy is subjected to hydrogen decrepitation, special fine cracks are introduced into powder particles, which facilitates the decarburization reaction. Incidentally, in the case where the object to be treated is magnet scrap having, for example, an organic film deposited on the surface thereof or the like, it is preferable to previously remove the surface deposit by a washing treatment with alcohol or the like, a chemical treatment with alkali or the like, a mechanical treatment by shot blasting or the like, etc.

The furnace for performing an HD step is not particularly limited as long as the HD step can be performed, examples thereof including an airflow furnace that can be used while introducing hydrogen gas to create a hydrogen gas atmosphere in the furnace (an inert gas such as Ar gas or He gas may be present in a proportion of 50 vol % or less), a vacuum furnace, and a pressurized furnace. However, in view of the efficiency of the decarburization treatment, etc., an airflow furnace is preferable. The temperature of the HD step is preferably 600° C. to 900° C., and more preferably 700° C. to 870° C. When the temperature is too low, the decarburization reaction may be difficult to proceed. Meanwhile, when it is too high, low-melting-point components contained in the carbon-containing R—Fe—B based permanent magnet alloy, which is an object to be treated, may leak out and adhere to the inner wall of the container containing the alloy, etc. The hydrogen pressure in the furnace is preferably 10 kPa to 500 kPa, and more preferably 20 kPa to 300 kPa. When the hydrogen pressure in the furnace is too low, the decarburization reaction may be difficult to proceed. Meanwhile, when it is too high, special measures or considerations may be required to maintain the durability of the furnace or prevent hydrogen gas from leaking out of the furnace, for example. The time of the HD step is preferably 1 hour or more, more preferably 3 hours or more, in order to allow the decarburization reaction to well proceed (although there is no particular upper limit on the time of the HD step, in view of the efficiency of the decarburization treatment, etc., the time of the HD step is suitably 4 hours to 8 hours). In the case where the HD step is performed using an airflow furnace, one example of the procedure is as follows. First, a carbon-containing R—Fe—B based permanent magnet alloy, which is an object to be treated, is placed in the furnace, and then the pressure in the furnace is once reduced to remove oxide for eliminating the risk of hydrogen explosion, etc. It is preferable that the pressure in the furnace is reduced until the pressure in the furnace reaches $4 \times 10^{-3}$ Pa or less. Next, the inside of the furnace is heated to the temperature of the HD step while introducing an inert gas, such as Ar gas or He gas, to bring the pressure in the furnace to atmospheric pressure (about 100 kPa). Subsequently, the introduction of the inert gas into the furnace is stopped, and the HD step is performed while introducing hydrogen gas instead. Considering the characteristics of the furnace, such as thermal conduction, thermal convection, and thermal radiation characteristics, it is preferable that the temperature in the furnace is raised to the temperature of the HD step at 200° C./h to 1000° C./h.

It is preferable that the DR step, which is performed after the HD step, is performed at 650° C. to 1000° C. by reducing the pressure in the furnace to 10 Pa or less or by introducing an inert gas such as Ar gas or He gas into the furnace (the pressure in the furnace is preferably 10 kPa or less). The DR step may be performed following the HD step in the furnace in which the HD step has been performed, and it is also possible that the object to be treated is transferred to another furnace and then subjected to the DR step. In view of the efficiency of the decarburization treatment, etc., the time of the DR step is preferably 15 minutes to 10 hours, and more preferably 30 minutes to 2 hours.

By subjecting a carbon-containing R—Fe—B based permanent magnet alloy to an HDDR treatment as above, carbon contained in the magnet alloy can be effectively removed (e.g., a carbon amount of 0.07 mass % or more can be reduced preferably to 0.04 mass % or less, more preferably to 0.03 mass % or less, and still more preferably to 0.02 mass % or less). This decarburization mechanism is presumably attributable to the following. By the HD step in which a rare earth element in the carbon-containing R—Fe—B based permanent magnet alloy is hydrogenated, and also a disproportionation reaction of the alloy structure is allowed to proceed, carbon that has been incorporated into the alloy structure is freed upon the decomposition of the alloy structure, and also carbon is reduced with hydrogen, thus converted into hydrocarbons, and released. Subsequently, by the DR step in which dehydrogenation is performed to allow a recombination reaction of the alloy structure to proceed, a magnet alloy having a predetermined alloy structure is reproduced. Incidentally, when a large amount of carbon-containing R—Fe—B based permanent magnet alloy is treated at once, the partial pressure of hydrocarbons released to the treatment environment may increase, making it difficult for the hydrocarbons produced in the alloy to be released, resulting in a decrease in the efficiency of the decarburization treatment. However, in the case where a magnet alloy is placed in a furnace and subjected to an HDDR treatment, when the magnet alloy in the furnace is stirred by rotating or shaking the furnace such that hydrocarbons do not stay in the same position in the furnace, hydrocarbons produced in the alloy are easily released. As a result, a decrease in the efficiency of the decarburization treatment can be avoided.

According to the present invention, in the case where a carbon-containing R—Fe—B based permanent magnet alloy, which is an object to be treated, is a powder, a powdery alloy recycled material is obtained as a result of the HDDR treatment. Such a powdery alloy recycled material thus obtained, alone or in combination with a virgin alloy material, for example, can be subjected to high-frequency heating in a vacuum melting furnace and thus recycled for the production of a magnet. A molten metal obtained by heating can be solidified by cooling and recovered in the form of a slab or an ingot, then subjected to component analysis, composition adjustment, or the like as required, and then used in the magnet production process. Incidentally, it is preferable that until high-frequency heating, the powdery alloy recycled material thus obtained is stored or handled in an inert gas atmosphere such as Ar gas or He gas. The powdery alloy recycled material may be fed to a vacuum melting furnace as it is. Alternatively, it is also possible that the material is formed into a rectangular parallelepiped about 3 mm to 1 cm on a side, a cylinder having more or less the same range of diameter and height, or the like using a hand-pressing machine, an automatic forming machine, or the like at a forming pressure of 10 $kgf/cm^2$ to 1000 $kgf/cm^2$ to enhance handleability, and then fed to a vacuum melting furnace.

EXAMPLES

Hereinafter, the present invention will be described in detail with reference to the examples, but the following descriptions are not to be construed as restrictive.

Example 1

Scrap produced in the process of R—Fe—B based sintered magnet processing (defectively processed solid waste; results of alloy composition analysis by TOP emission spectrometry: Nd: 20.86, Pr: 5.82, Dy: 4.09, Fe: 66.40, B: 1.00, remainder: 1.83 (unit: mass %)) was washed with ethanol, then ground in a stamp mill, and sieved and classified to obtain alloy powders of various particle sizes (classification using a sieve defined in JIS Z 8801-1 in accordance with the method of JIS Z 2510). About 3 g of the alloy powder of each particle size was placed in a tubular airflow furnace, and the pressure in the furnace was once reduced to $4\times10^{-3}$ Pa. Next, while introducing Ar gas at a flow rate of 2 L/min to bring the pressure in the furnace to atmospheric pressure (about 100 kPa), the temperature in the furnace was raised from room temperature to 850° C. in 1 hour. Subsequently, the introduction of Ar gas into the furnace was stopped, and, while introducing hydrogen gas at a flow rate of 2 L/min instead to bring the pressure in the furnace to atmospheric pressure, an HD step was performed at 850° C. for 4 hours. 4 hours later, with the temperature maintained at 850° C., the introduction of hydrogen gas into the furnace was stopped, and, while introducing Ar gas at a flow rate of 2 L/min instead to bring the pressure in the furnace to 5.3 kPa, a DR step was performed for 1 hour. Subsequently, Ar gas was introduced into the furnace at a flow rate of 10 L/min or more to bring the pressure in the furnace back to atmospheric pressure, the temperature in the furnace was lowered to room temperature, and then the alloy powder was taken out from the furnace. The amount of carbon contained in the alloy powder before and after the HDDR treatment was measured using a gas analyzer EMIA-820 manufactured by HORIBA, Ltd. The results are shown in Table 1. As is clear from Table 1, it turned out that by subjecting a carbon-containing alloy powder to an HDDR treatment, carbon can be effectively removed.

TABLE 1

| | Particle Size of Alloy Powder (μm) | | | | | |
|---|---|---|---|---|---|---|
| | <75 | 75-150 | 150-300 | 300-425 | 425-600 | 600-850 |
| Amount of Carbon before Treatment | 0.091 | 0.077 | 0.070 | 0.068 | 0.067 | 0.067 |
| Amount of Carbon after Treatment | 0.020 | 0.017 | 0.018 | 0.018 | 0.017 | 0.016 |

(unit: mass %)

Example 2

An HDDR treatment was performed in the same manner as in Example 1, except that magnet scrap was decrepitated by hydrogen decrepitation (treated in a pressurized furnace at room temperature and a hydrogen pressure of 200 kPa for 1 hour) and about 0.35 g of the alloy powder of each particle size was placed in a tubular airflow furnace. The amount of carbon contained in the alloy powder before and after the HDDR treatment was measured. The results are shown in Table 2. As is clear from Table 2, it turned out that carbon contained in an alloy powder cannot be removed by hydrogen decrepitation (based on comparison with the amount of carbon contained in the alloy powders ground in a stamp mill in Example 1), and also that carbon can be removed more effectively by an HDDR treatment from an alloy powder decrepitated by hydrogen decrepitation than from an alloy powder ground in a stamp mill.

TABLE 2

| | Particle Size of Alloy Powder (μm) | | | | | |
|---|---|---|---|---|---|---|
| | <75 | 75-150 | 150-300 | 300-425 | 425-600 | 600-850 |
| Amount of Carbon before Treatment | 0.095 | 0.082 | 0.080 | 0.078 | 0.077 | 0.076 |

TABLE 2-continued

| | Particle Size of Alloy Powder (μm) | | | | | |
|---|---|---|---|---|---|---|
| | <75 | 75-150 | 150-300 | 300-425 | 425-600 | 600-850 |
| Amount of Carbon after Treatment | 0.013 | 0.010 | 0.011 | 0.009 | 0.010 | 0.007 |

(unit: mass %)

Example 3

An HDDR treatment was performed in the same manner as in Example 1, except that about 12 g of an alloy powder having a particle size of 150 μm to 300 μm was placed in a pressurized furnace, an HD step was performed at various temperatures for 1 hour while introducing hydrogen gas into the furnace to maintain the pressure in the furnace at 110 kPa, then 1 hour later, the inside of the furnace was replaced with Ar gas, and a DR step was performed at 850° C. for 1 hour while maintaining the pressure in the furnace at 0.3 kPa. The amount of carbon contained in the alloy powder before and after the HDDR treatment was measured. The results are shown in Table 3. As is clear from Table 3, the carbon-removing effect of an HD step at 600° C. to 900° C. was confirmed.

TABLE 3

| | Temperature of HD Step (° C.) | | | | |
|---|---|---|---|---|---|
| | 600 | 700 | 800 | 850 | 900 |
| Amount of Carbon before Treatment | | | 0.073 | | |
| Amount of Carbon after Treatment | 0.059 | 0.049 | 0.045 | 0.043 | 0.051 |

(unit: mass %)

Example 4

An HDDR treatment was performed in the same manner as in Example 3, except that an HD step was performed at 850° C. for various periods of time. The amount of carbon contained in the alloy powder before and after the HDDR treatment was measured. The results are shown in Table 4. As is clear from Table 4, the amount of carbon contained in the alloy powder decreased with an increase in the time of the HD step. The amount decreased to 0.05 mass % or less with 1 hour, 0.03 mass % or less with 2 hours, and 0.02 mass % or less with 4 hours.

TABLE 4

| | Time of HD Step (hour) | | | |
|---|---|---|---|---|
| | 0.5 | 1 | 2 | 4 |
| Amount of Carbon before Treatment | | 0.073 | | |
| Amount of Carbon after Treatment | 0.055 | 0.043 | 0.028 | 0.013 |

(unit: mass %)

Example 5

Carbon contained in an alloy powder classified into a particle size of 300 μm to 2800 μm obtained in the same manner as in Example 1 from the scrap produced in the process of R—Fe—B based sintered magnet processing mentioned in Example 1 was removed using a rotary furnace in the treatment pattern shown in FIG. 1. Specifically, first, the alloy powder was placed in the furnace. Subsequently, the inside of the furnace was replaced with an Ar gas atmosphere, and then the temperature in the furnace was raised from room temperature to 300° C. in 30 minutes. Next, while introducing hydrogen gas into the furnace at a flow rate of 5 L/min, with the temperature in the furnace maintained at 300° C., the alloy powder was subjected to hydrogen decrepitation for 1 hour. Subsequently, the rotation of the furnace at 3 rpm was started. The temperature in the furnace was raised from 300° C. to 850° C. in 1 hour while introducing hydrogen gas into the furnace at a flow rate of 2.5 L/min, and, while successively introducing hydrogen gas into the furnace at a flow rate of 2.5 L/min, an HD step was performed at 850° C. for 4 hours. 4 hours later, with the temperature maintained at 850° C., the introduction of hydrogen gas into the furnace was stopped, and instead, Ar gas was introduced for 10 minutes to replace the inside of the furnace with an Ar gas atmosphere. Subsequently, a vacuum was drawn to reduce the pressure in the furnace to 0.3 Pa or less, and a DR step was performed for 5 hours at the reduced pressure. Subsequently, Ar gas was introduced into the furnace to bring the pressure in the furnace back to atmospheric pressure, the temperature in the furnace was lowered to room temperature, and then the alloy powder was taken out from the furnace. Incidentally, the rotation of the furnace was stopped 1 hour after the completion of the HD step. The amount of carbon contained in the alloy powder before placed in the furnace and that in the alloy powder taken out from the furnace were measured. As a result, the former was 0.070 mass %, while the latter was 0.026 mass %, showing that carbon contained in an alloy powder can be effectively removed by this method.

Example 6

A treatment was performed in the same manner as in Example 5, except that hydrogen gas was introduced into a furnace at a flow rate of 5 L/min when the temperature in the furnace was raised from 300° C. to 850° C. and also when the HD step was performed. Then, the amount of carbon contained in the alloy powder before placed in the furnace and that in the alloy powder taken out from the furnace were measured. As a result, the former was 0.070 mass %, while the latter was 0.014 mass %, showing that when the flow rate of hydrogen gas introduction into a furnace at the time of raising the temperature in the furnace from 300° C. to 850° C. and at the time of performing an HD step was twice the flow rate of hydrogen gas introduction into the furnace in Example 5, carbon contained in an alloy powder can be removed more effectively.

Example 7

A treatment was performed in the same manner as in Example 5, except that a slab produced by a method in which a used R—Fe—B based sintered magnet recovered from the market was fed to a high-frequency vacuum melting furnace, melted, and then cast by strip casting (results of alloy composition analysis by ICP emission spectrometry: Nd: 22.96, Pr: 6.44, Dy: 1.03, Fe: 66.96, B: 1.15, remainder: 1.52 (unit: mass %)) was placed in a furnace. Then, the amount of carbon contained in the furnace before placed in the furnace and that in the decrepitated slab powder taken out from the furnace were measured. As a result, the former was 0.043 mass %, while the latter was 0.030 mass %, showing that carbon contained in a slab can be effectively removed by this method.

Example 8

A treatment was performed in the same manner as in Example 7, except that hydrogen gas was introduced into a furnace at a flow rate of 5 L/min when the temperature in the furnace was raised from 300° C. to 850° C. and also when the HD step was performed. Then, the amount of carbon contained in the slab before placed in the furnace and that in the decrepitated slab powder taken out from the furnace were measured. As a result, the former was 0.043 mass %, while the latter was 0.014 mass %, showing that when the flow rate of hydrogen gas introduction into a furnace at the time of raising the temperature in the furnace from 300° C. to 850° C. and at the time of performing an HD step was twice the flow rate of hydrogen gas introduction into the furnace in Example 7, carbon contained in a slab can be removed more effectively.

Example 9

600 g of the alloy powder obtained by the HD step for 4 hours in Example 4 was formed into 1000 cylinders (3.5 mm in diameter×5 mm in height) at a forming pressure of about 600 kgf/cm$^2$ using a hand-pressing machine (manufactured by SCHMIDT Feintechnik GmbH). The obtained cylinders were placed in a mullite crucible, and then the crucible was placed in a high-frequency vacuum melting furnace. The furnace was once evacuated using a mechanical booster pump. Subsequently, pure Ar gas was introduced into the furnace to maintain the pressure in the furnace at 40 kPa, and then electricity was charged to start temperature rise. As a result of the visual observation of the inside of the crucible in the furnace, the cylinders placed in the crucible started melting at 1250° C. Subsequently, after maintained at 1400° C. for 15 minutes, the crucible was inclined to pour the molten metal into a rotary roller for strip casting, and the resulting continuous slab was crushed in a pin mill. Thus, a slab about 10 mm on a side and about 0.3 mm in thickness was recovered. Using this slab, an R—Fe—B based sintered magnet was produced by a standard method.

Example 10

Figure 2:
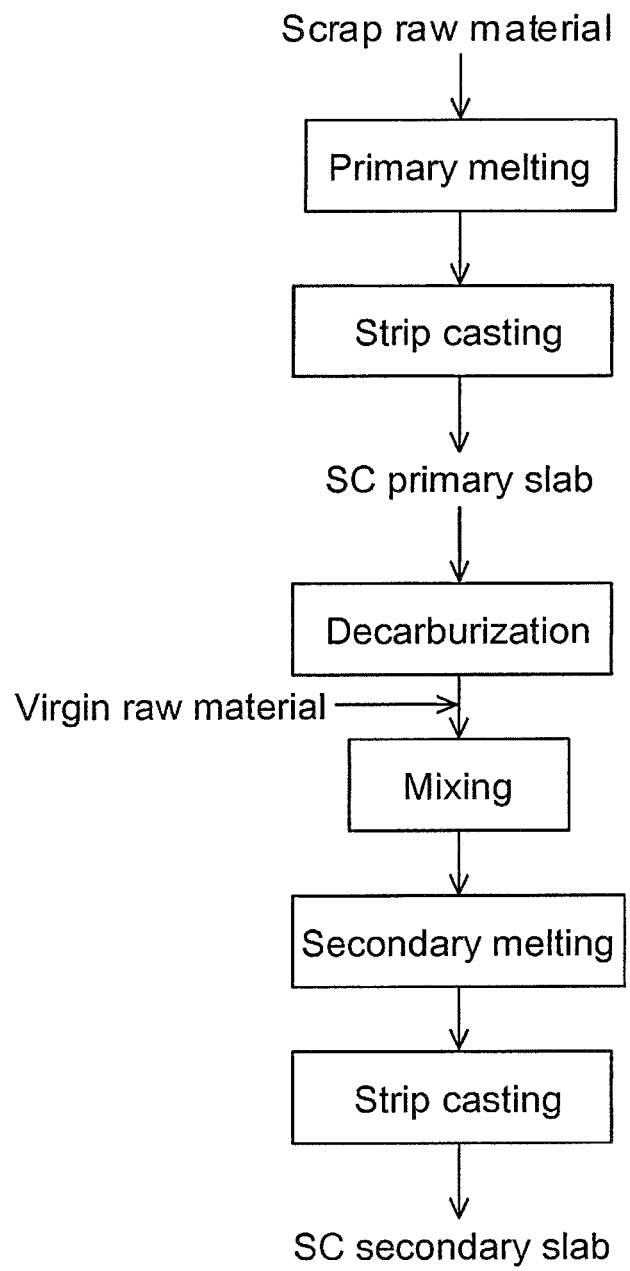
FIG. 2 It shows a flow for producing a slab for the production of an R—Fe—B based sintered magnet employed in Example 10.

A slab for the production of an R—Fe—B based sintered magnet was produced according to the production flow shown in FIG. 2. Specifically, first, the scrap produced in the process of R—Fe—B based sintered magnet processing mentioned in Example 1 (scrap raw material) was fed to a high-frequency vacuum melting furnace, melted (primary melting), and then cast by strip casting to give a SC primary slab. Next, the SC primary slab (carbon content: 0.04 mass % or more) was placed in a rotary furnace, and carbon contained in the slab was removed in the same manner as in Example 8. The decrepitated slab powder taken out from the furnace (carbon content: 0.02 mass % or less) was mixed with a virgin alloy material (virgin raw material) for the production of an R—Fe—B based sintered magnet in a ratio of 3:7 (weight ratio), then fed to a high-frequency vacuum melting furnace, melted (secondary melting), and cast by strip casting to give a SC secondary slab. Using this SC secondary slab, an R—Fe—B based sintered magnet was produced by a standard method.

Reference Example 1

Test for Confirmation of Decarburization Effect of HD Step in HDDR Treatment

Figure 3:
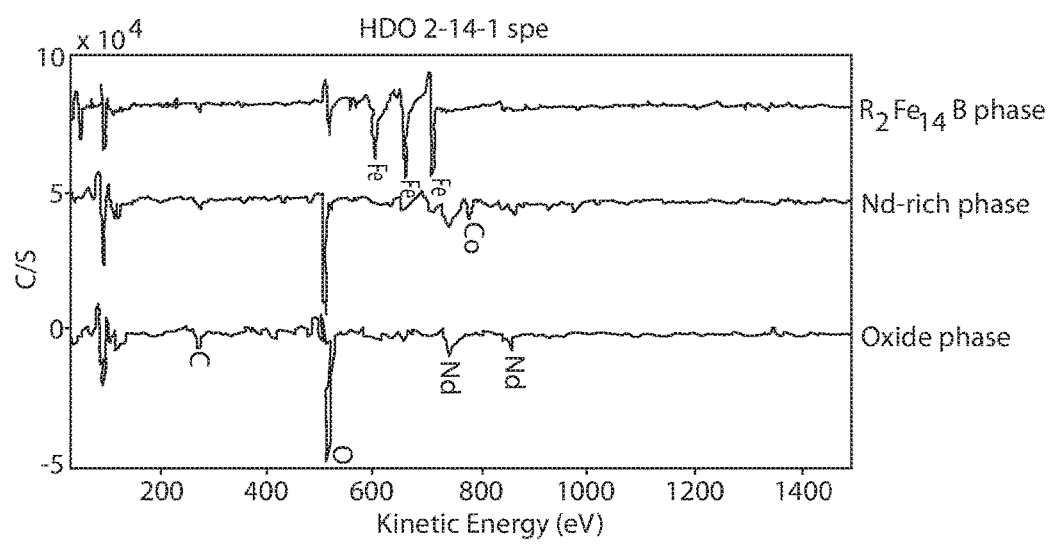
FIG. 3 It is a qualitative spectrum showing the local distribution of carbon in a sample before an HD step in Reference Example 1.
Figure 4:
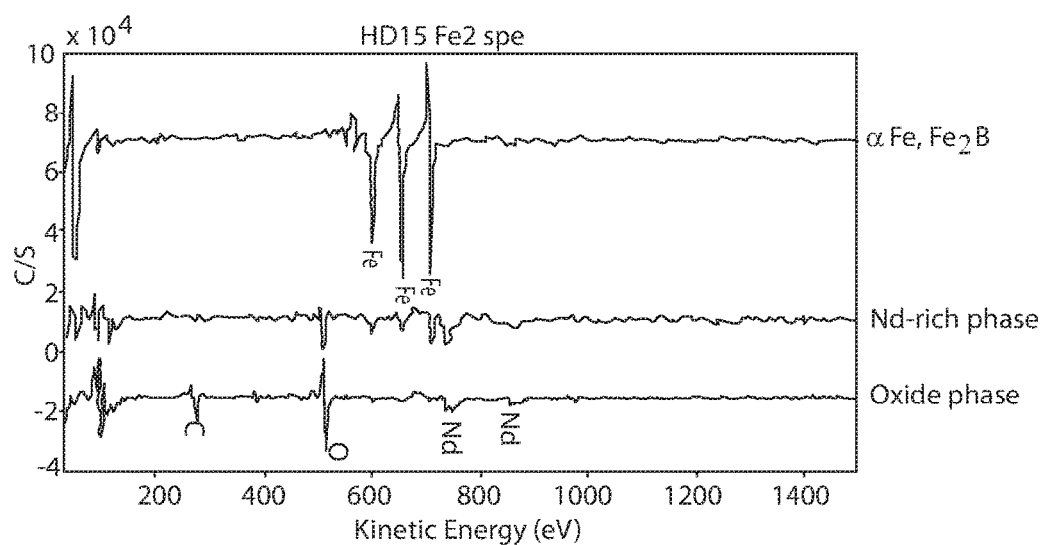
FIG. 4 Similarly, it is a qualitative spectrum showing the local distribution of carbon in a sample subjected to an HD step for 15 minutes.
Figure 5:
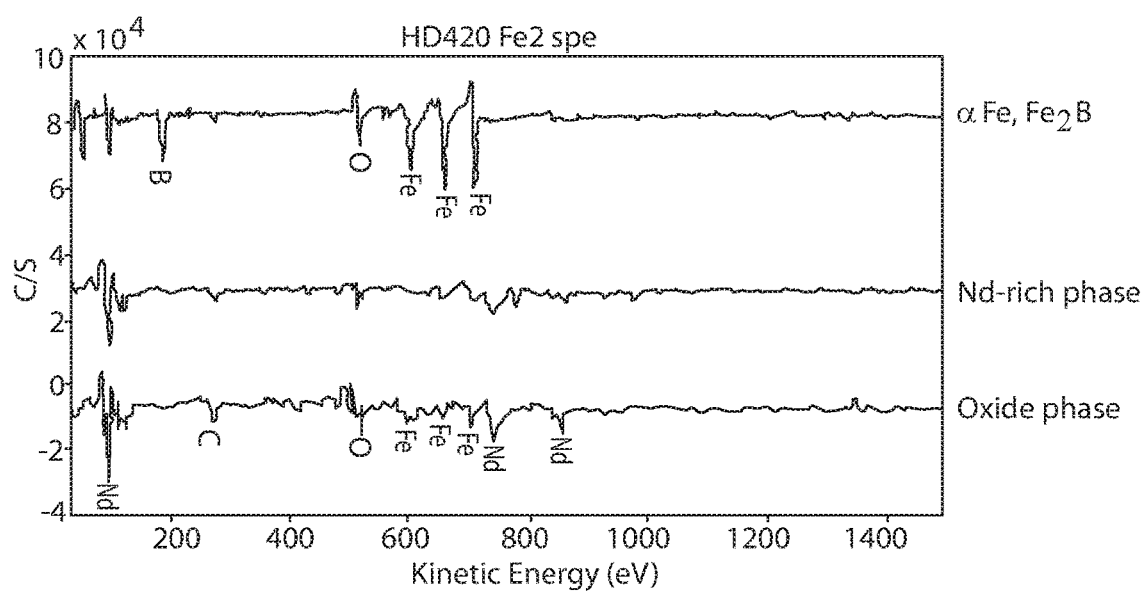
FIG. 5 Similarly, it is a qualitative spectrum showing the local distribution of carbon in a sample subjected to an HD step for 420 minutes.

The scrap produced in the process of R—Fe—B based sintered magnet processing mentioned in Example 1 was cut to a dimension of 2 mm×2 mm×20 mm to prepare a sample. The sample was subjected to an HD step of an HDDR treatment for a predetermined period of time in the same manner as in Example 1. Subsequently, the temperature in the furnace was lowered to room temperature, and then the sample was taken out from the furnace. The sample before the HD step, the sample subjected to the HD step for 15 minutes, and the sample subjected to the HD step for 420 minutes were each broken under vacuum in a scanning Auger electron spectrometer (FE-AES analyzer: PHI-700 manufactured by ULVAC-PHI, INCORPORATED). With respect to the typical $Nd_2Fe_{14}B$ phase (main phase: a region made of αFe and $Fe_2B$ after the HD step), Nd-rich phase (grain boundary phase), and oxide phase (grain-boundary triple junction) present in the broken surface, element mapping was performed, and also qualitative spectra were obtained. The local distribution of carbon in each phase was thus examined. FIG. 3, FIG. 4, and FIG. 5 show the qualitative spectrums of the sample before the HD step, the sample subjected to the HD step for 15 minutes, and the sample subjected to the HD step for 420 minutes, respectively. As is clear from FIG. 3 to FIG. 5, in the sample before the HD step, the presence of carbon was observed in all of the $Nd_2Fe_{14}B$ phase, Nd-rich phase, and oxide phase. However, in the sample subjected to the HD step for 15 minutes, the degree of the presence of carbon decreased in the region made of αFe and $Fe_2B$ derived from the $Nd_2Fe_{14}B$ phase and also in the Nd-rich phase, while the degree of the presence of carbon increased in the oxide phase. In the sample subjected to the HD step for 420 minutes, the degree of the presence of carbon in the oxide phase decreased as compared with the sample subjected to the HD step for 15 minutes. These results suggest that when a carbon-containing R—Fe—B based permanent magnet alloy is subjected to an HD step, carbon that has been widely distributed over the alloy structure is concentrated in the oxide phase, and, with the lapse of time, carbon concentrated in the oxide phase is gradually released, resulting in a decarburization effect. Incidentally, exhaust gas from the furnace was sampled at the exit of the airflow furnace and subjected to component analysis by gas chromatography. As a result, the presence of a hydrocarbon (methane) was observed. This shows that when a carbon-containing magnet alloy is subjected to an HD step, carbon contained in the magnet alloy is reduced with hydrogen, thus converted into a hydrocarbon, and released.

INDUSTRIAL APPLICABILITY

The present invention makes it possible to provide a method for producing an alloy recycled material by effectively removing carbon from a carbon-containing alloy, which is produced as scrap or sludge of an R—Fe—B based permanent magnet, a used magnet, or the like. In this respect, the present invention is industrially applicable.

The invention claimed is:

1. A method for recycling a carbon-containing R—Fe—B based permanent magnet alloy, comprising the steps of:
    removing carbon in the carbon-containing R—Fe—B based permanent magnet alloy by subjecting the carbon-containing R—Fe—B based permanent magnet alloy to a Hydrogenation-Disproportionation-Desorption-Recombination treatment, wherein the carbon-containing R—Fe—B based permanent magnet alloy contains a carbon content of 0.04 mass % or more, and
    melting by heating an R—Fe—B based permanent magnet alloy from which carbon was removed, wherein a carbon content of the R—Fe—B based permanent magnet alloy from which carbon was removed is 0.03 mass % or less.

2. The method according to claim 1, characterized in that the carbon-containing R—Fe—B based permanent magnet alloy is in the form of a powder having a particle size of 75 μm to 850 μm.

3. The method according to claim 1, characterized in that the Hydrogenation-Disproportionation-Desorption-Recombination treatment includes a Hydrogenation and Disproportionation step performed in a hydrogen gas atmosphere at 600° C. to 900° C.

4. The method according to claim 1, characterized in that the Hydrogenation-Disproportionation-Desorption-Recombination treatment to remove carbon is followed by melting by heating and then solidification by cooling to form a slab or an ingot.

5. The method according to claim 1, characterized in that the carbon-containing R—Fe—B based permanent magnet alloy is selected from the group consisting of magnet scrap, magnet sludge and used magnets.

6. A method for producing an R—Fe—B based permanent magnet, comprising the steps of:
    removing carbon in a carbon-containing R—Fe—B based permanent magnet alloy by subjecting the carbon-containing R—Fe—B based permanent magnet alloy to a Hydrogenation-Disproportionation-Desorption-Recombination treatment, wherein the carbon-containing R—Fe—B based permanent magnet alloy contains a carbon content of 0.04 mass % or more, and
    melting by heating an R—Fe—B based permanent magnet alloy from which carbon was removed as at least a part of raw materials for producing an R—Fe—B based permanent magnet, wherein a carbon content of the R—Fe—B based permanent magnet alloy from which carbon was removed is 0.03 mass % or less.

* * * * *